Jan. 26, 1932.                C. C. FARMER                1,842,517
                           FLUID PRESSURE BRAKE
                           Filed Dec. 14, 1929
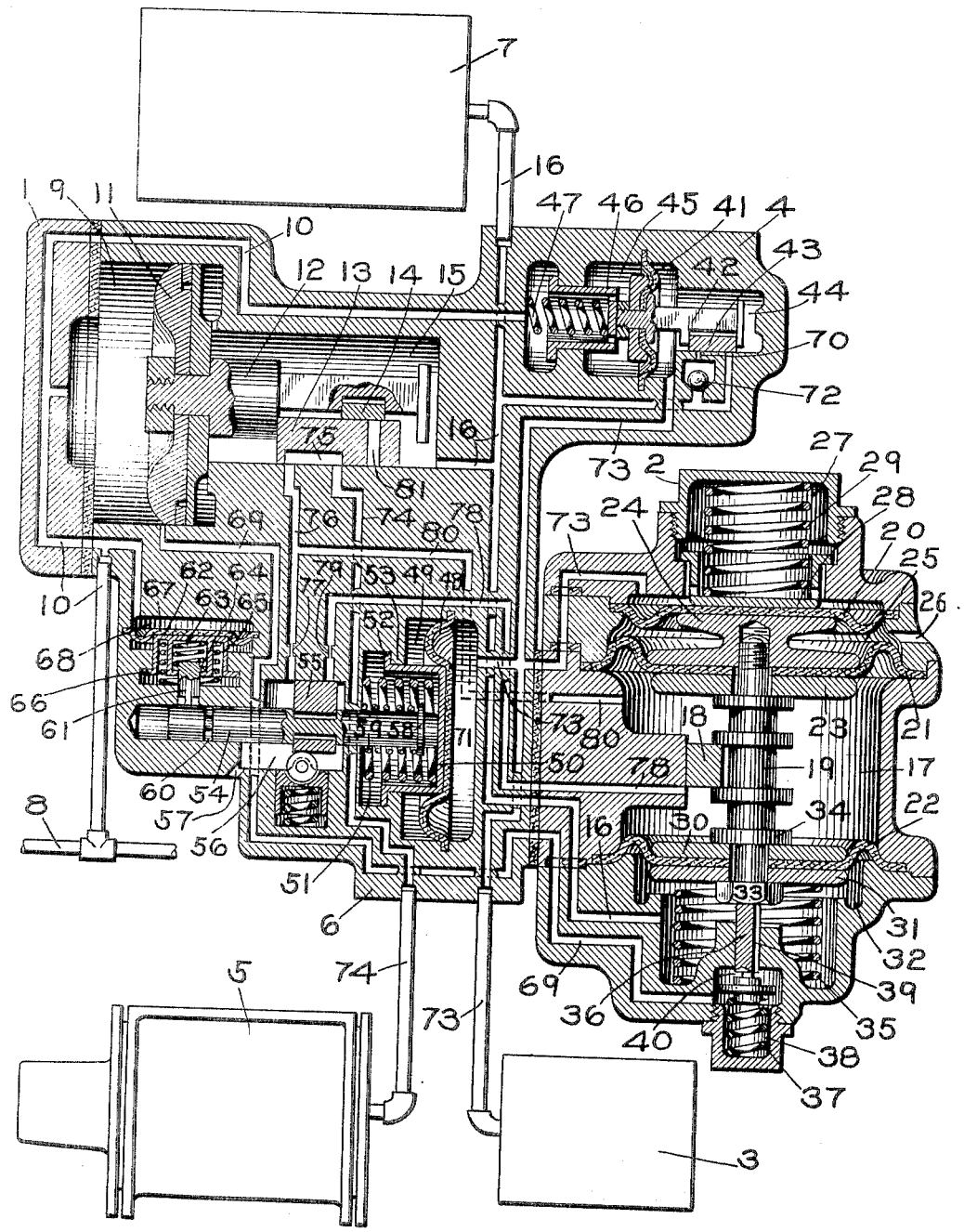
INVENTOR
CLYDE C. FARMER
BY *Wm. W. Cady*
ATTORNEY Patented Jan. 26, 1932

1,842,517

UNITED STATES PATENT OFFICE

CLYDE C. FARMER, OF PITTSBURGH, PENNSYLVANIA, ASSIGNOR TO THE WESTING-HOUSE AIR BRAKE COMPANY, OF WILMERDING, PENNSYLVANIA, A CORPORATION OF PENNSYLVANIA

FLUID PRESSURE BRAKE

Application filed December 14, 1929. Serial No. 413,982.

This invention relates to fluid pressure brakes and has for its principal object to provide means whereby the engineer may, from his station in the locomotive cab, obtain at will, either a direct or a graduated release of the brakes in a car or train of cars to which the locomotive is coupled.

Another object of my invention is to provide a fluid pressure brake equipment having a change-over valve device which is operative automatically to provide for the direct or the graduated release of the brakes.

Other objects and advantages will appear in the following more detailed description of the invention.

In the accompanying drawing, the single figure is a diagrammatic view, mainly in section, of a fluid pressure brake equipment embodying my invention.

According to my invention, the brake equipment may comprise a triple valve device 1, a control valve device 2, a control reservoir 3, a combined control reservoir charging and discharging valve device 4, a brake cylinder 5, a release change-over valve device 6, an auxiliary reservoir 7, and a brake pipe 8.

The triple valve device 1 may comprise a casing having a piston chamber 9 which is connected to the brake pipe 8 through a passage and pipe 10 and contains a piston 11 having a stem 12 adapted to operate a main slide valve 13 and an auxiliary slide valve 14 contained in a chamber 15, which chamber 15 is connected to the auxiliary reservoir 7 through a passage and pipe 16.

The control valve device 2 may comprise a casing having a valve chamber 17 containing a slide valve 18 which is operatively connected to an operating stem 19. The valve 18 and stem 19 are adapted to be operated through the medium of spaced flexible diaphragms 20, 21 and 22 which are secured in the casing.

The flexible diaphragm 21 is clamped between a follower plate 23 contained in the slide valve chamber 17 and a follower member 24 contained in a chamber 25 constantly connected to the atmosphere through a passage 26. The follower member 24 has screw-threaded connection with the stem 19 and the upper end of said member engages the under side of the diaphragm 20.

Contained in a chamber 27 at one side of the diaphragm 20 is a movable stop 28 which is subject, on one side, to the pressure of a spring 29.

The flexible diaphragm 22 is clamped between a follower plate 30 contained in the chamber 17 and a follower plate 31 contained in a chamber 32, through the medium of a nut 33 having screw-threaded connection with the lower end of the stem 19, which end passes through the follower plates and the diaphragm, the upper side of the plate 30 abutting against a shoulder 34 on the stem 19, and the nut 33 engaging the under side of the plate 31. Contained in the chamber 32 and interposed between and engaging the under side of the plate 31 and the casing, is a coil spring 35.

Within the chamber 32, the lower end of the stem 19 engages the upper end of a fluid pressure supply control member 36 which is slidably mounted in the casing and which is subject to the pressure of a coil spring 37 contained in a chamber 38 and interposed between and engaging the lower end of the member and the casing.

The member 36 is provided with a longitudinal groove 39, the lower end of which is open to a circular groove 40 formed in the member adjacent its lower end, said grooves establishing communication from the chamber 38 to the diaphragm chamber 32.

The combined control reservoir charging and discharging valve device 4 may comprise a casing in which there is secured a flexible diaphragm 41, having secured thereto a stem 42 adapted to operate a slide valve 43 contained in a chamber 44 at one side of the diaphragm.

Contained in a chamber 45 at the other side of the diaphragm 41, is a stop 46 which is subject to the pressure of a coil spring 47 and which is adapted to be engaged by one end of the stem 42.

The release change-over valve device 6 may comprise a casing in which there is mounted a flexible diaphragm 48, the chamber 49, at one side of the diaphragm, containing a follower 50 which engages one side of the diaphragm, said follower being subject to the pressure of a coil spring 51 contained in the chamber 49. This follower may be provided with an annular flange 52 which is adapted to engage an annular lug 53 on the casing so as to limit the movement of the follower in a direction toward the right hand.

The valve device 6 also comprises a valve stem 54 which is slidably mounted in the casing and which is adapted to operate a slide valve 55 contained in a chamber 56 constantly connected to the atmosphere through a passage 57.

The valve stem 54, adjacent one end is provided with a collar 58 and interposed between and engaging this collar and the casing is a spring 59, the pressure of which tends, at all times, to maintain the end of the stem in engagement with the follower 50.

Adjacent its other end, this valve stem is provided with a circular groove 60 within which the outer end of a locking member or latch 61, slidably mounted in the casing, is adapted to engage the stem. The inner end of this latch 61 is slidably mounted in a follower 62 and is subject to the pressure of a spring 63 interposed between and engaging the latch 61 and follower 62, undue movement of the latch, relative to the follower, being prevented by an annular collar 64 on the latch engaging suitable stops on the follower.

The follower 62 is subject to the pressure of a spring 65, and is limited in its upward movement by an annular flange 66 engaging a corresponding lug formed on the casing. The upper surface of the follower engages with the under side of flexible diaphragm 67 mounted in the casing, there being a chamber 68 at the upper side of the diaphragm which is constantly connected to the passage 10.

In initially charging the equipment, fluid under pressure supplied to the brake pipe 8, flows through pipe and passage 10 to the triple valve piston chamber 9, the diaphragm chamber 68 in the change-over valve device and the diaphragm chamber 45 in the valve device 4.

The pressure of fluid thus supplied to the piston chamber 9 causes the triple valve piston 11 to be moved to its innermost or release position, as shown in the drawing, carrying with it the slide valves 13 and 14. With the piston in this position, fluid supplied to the piston chamber 9, flows to the triple valve slide valve chamber 15 and auxiliary reservoir 7 through a passage 69, chamber 38 in the control valve device 2, grooves 40 and 39 in the member 36, diaphragm chamber 32 and passage and pipe 16.

The pressure of fluid supplied to the diaphragm chamber 45 in the valve device 4, causes the diaphragm 41 to flex to shift the stem 42 and slide valve 43 in a direction toward the right hand to their charging positions, in which the slide valve 43 uncovers a restricted port 70, so that fluid under pressure supplied to the passage 16 will also flow to the flexible diaphragm chamber 27 in the control valve device, a diaphragm chamber 71 at one side of the flexible diaphragm 48 of the change-over valve device 6 and to the control reservoir 3, past a ball check valve 72, through port 70, slide valve chamber 44 and passage 73.

With the triple valve device in release position, the brake cylinder 5 is connected to the atmosphere by way of a pipe and passage 74, a cavity 75 in the main slide valve 13, a passage 76 having a restriction 77, valve chamber 56 in the change-over valve device and passage 57.

The flexible diaphragms 20 and 22 are of equal area, and since the pressure of fluid supplied to the diaphragm chambers 27 and 32 are substantially equal, the pressure of the spring 35 will maintain the diaphragm 20 in engagement with the spring pressed stop 28. When the diaphragm 20 engages the stop, the control valve device will be balanced and the valve 18 will have been moved upwardly beyond a passage 78 leading to the seat of the change-over slide valve 55, said passage containing a restriction 79.

The pressure of the spring 51 of the change-over valve device is such that, when the normal pressure is carried in the brake system, and in the control reservoir and diaphragm chamber 71 in the change-over valve device, the flexible diaphragm 48 will be maintained, by such spring pressure, in the position shown in the drawing, with the stem 54 maintained in its right hand position by the pressure of the spring 59, so that the slide valve covers the passage 78 and uncovers the passage 76.

With the passage 76 uncovered, the valve chamber 17 in the control valve device is connected to the atmosphere by way of a passage 80, passage 76, restriction 77, valve chamber 56 in the change-over valve device and passage 57.

With the equipment thus fully charged and the brake cylinder connected to the atmosphere, a service application of the brakes is effected by making a gradual brake pipe reduction in the usual manner, which results in a corresponding reduction in the pressure of fluid in the triple valve piston chamber 9. When the pressure of fluid in the piston chamber 9 is thus reduced, the pressure of fluid in the slide valve chamber 15 causes the triple valve piston 11 to operate to shift the auxiliary slide valve 14 and main slide valve 13 to their application positions.

When the triple valve slide valves are thus operated to their application positions, fluid under pressure supplied to the slide valve chamber 15 from the auxiliary reservoir 7, flows to the brake cylinder 5 through a port 81 in the main slide valve 13 and passage and pipe 74.

If, in effecting an application of the brakes, it is desired to limit the brake cylinder pressure, the usual brake valve device (not shown) is operated to lap position. Now when the pressure of fluid in the auxiliary reservoir, present in the slide valve chamber 15 in the triple valve device, becomes slightly less than the brake pipe pressure present in the triple valve piston chamber 9 the triple valve piston is caused to operate to shift the auxiliary slide valve 14, relative to the main slide valve 13, to service lap position, in which the slide valve 14 laps port 81 in the main slide valve 13, thus closing off the further supply of fluid pressure to the brake cylinder.

To release the brakes after a service application, the pressure of fluid in the brake pipe 8 is increased in the usual well known manner, causing the triple valve piston 11 to operate to shift the triple valve slide valves 13 and 14 to their innermost or release positions. With the main slide valve 13 in released position, fluid under pressure is vented from the brake cylinder 5 to the atmosphere by way of pipe and passage 74, cavity 75 in the main slide valve 13, passage 76, restriction 77, valve chamber 56 in the change-over valve device and passage 57.

Thus far, in the specification, the operation of the equipment has been described with the change-over valve device 6 in its unlocked or direct release position.

Should it be desired to effect the graduated release of the brakes, the engineer adjusts the usual feed valve device (not shown) on the locomotive, so as to provide a definite higher pressure in the brake pipe than the normal pressure carried in the brake pipe.

Fluid at this higher pressure is supplied to the auxiliary reservoir 7 by way of pipe and passage 10, triple valve piston chamber 9, passage 69, chamber 38 in the control valve device, grooves 40 and 39 in the member 36, diaphragm chamber 32 and passage and pipe 16.

From the passage 10, fluid at this higher pressure is also supplied to the diaphragm chamber 45 in the valve device 4, causing the diaphragm 41 to flex toward the right hand, which in turn, shifts the slide valve 43 to its charging position, in which the passage 70 is uncovered. With the passage 70 thus uncovered, fluid under pressure supplied from the passage 16 flows to the control reservoir 3, diaphragm chamber 27 in the control valve device and diaphragm chamber 71 in the change-over valve device.

The pressure of fluid thus supplied to the diaphragm chamber 71 is sufficient to overcome the pressure of the spring 51, so that the diaphragm 48 is flexed, shifting the stem 54 toward the left hand, against the pressure of the spring 59, causing the change-over slide valve 55 to be moved so as to uncover the passage 79 and to blank the passage 76.

The pressure of fluid supplied to the diaphragm chamber 68 in the change-over valve device, flexes the diaphragm 67 downwardly, causing the follower 62 to move in the same direction against the pressure of the spring 65. The follower 62 moves relative to the latch 61 and compresses the spring 63 and the latch 61 is pressed into contact with the stem 54. The spring 63 is a relatively light one, and the pressure of the latch 61, on the stem 54, is limited to the pressure of this spring, so that the frictional resistance of the latch to the movement of the stem is insufficient to interfere with the proper operation of the stem.

When the stem 54 has been shifted toward the left hand a sufficient distance that the change-over slide valve 55 uncovers the passage 78 and blanks the direct release passage 76, the groove 60, in the stem 54, will be in line with the latch 61. As the groove 60 comes in line with the latch 61, the pressure of the spring 63 causes the latch to move, relative to the follower 62, into engagement with the stem 54 within the groove 60, thus positively locking the stem 54 and thereby the slide valve 55 in their left hand or graduated release positions.

The purpose of the locking latch is to prevent the change-over valve device from operating unintentionally to its direct release position in case the control reservoir pressure is reduced below that required to maintain the spring 51 compressed.

With the change-over valve device 6 in graduated release position, as just described, a service application of the brakes is effected by making a gradual brake pipe reduction in the usual manner, which permits the triple valve device to operate in the manner hereinbefore described to supply fluid under pressure from the auxiliary reservoir 7 to the brake cylinder 5.

With the triple valve piston 11 in application position, the passage 69 is connected to the triple valve slide valve chamber 15 so that pressure of fluid in the diaphragm chamber 32 will reduce with the auxiliary reservoir pressure.

When the auxiliary reservoir pressure present in the diaphragm chamber 32 is thus reduced, the higher control reservoir pressure present in the diaphragm chamber 27, acting on the diaphragm 20, causes said diaphragm to operate to shift the control slide valve 18 downwardly against the reduced auxiliary reservoir pressure in chamber 32 and the pressure of the spring 35, blanking the passage 78 and thereby closing communication from the control valve chamber 17 to the atmosphere.

It will here be noted, that the spring 47 of the valve device 4 is of such a value that, when a service reduction in brake pipe pressure is effected, the stop 46, which is subject to the pressure of the spring 47, will prevent the diaphragm 41 from operating to shift the slide valve 43 to such a position that it will uncover the passage 16 leading to the auxiliary reservoir, and thus the control reservoir pressure will be maintained to govern the operation of the control valve device 2.

To release the brakes after a service application with the change-over valve device in graduated release position, the pressure of fluid in the brake pipe 8 is increased in the usual manner, causing the triple valve device to operate to release position, in which the passage 69 is again connected to the triple valve piston chamber 9, so that fluid at brake pipe pressure is again supplied from the chamber 9 to the diaphragm chamber 32 in the control valve device and auxiliary reservoir 7.

Now when the pressure of fluid thus supplied to the chamber 32, acting on the under side of the diaphragm 22, together with the pressure of fluid from the brake cylinder and present in the control slide valve chamber 17, acting on the under side of the large diaphragm 21, is substantially equal to the pressure of fluid from the control reservoir acting on the upper side of the diaphragm 20 together with the pressure of fluid in the chamber 17 acting on the upper side of the diaphragm 22, the pressure of the spring 35 causes the diaphragms and stem 19 to be operated upwardly until they are brought to a stop by the diaphragm 20 engaging the spring pressed stop 28 at which time the control slide valve 18 will have been moved to a position in which the passage 78 is uncovered.

With the passage 78 thus uncovered, fluid under pressure is discharged from the brake cylinder 5 to the atmosphere through pipe and passage 74, cavity 75 in the triple valve slide valve 13, passages 76 and 80, slide valve chamber 17 in the control valve device, past the end of the control slide valve 18, through passage 78, restriction 79, change-over slide valve chamber 56 and passage 57.

If after a service application of the brakes, it is desired to graduate their release, the brake pipe pressure may be increased to effect the desired reduction in brake cylinder pressure. This increase in brake pipe pressure causes the triple valve device to operate to release position, in which, the brake cylinder 5 is connected to the valve chamber 17 in the control valve device through pipe and passage 74, cavity 75 in the triple valve slide valve 13 and passages 76 and 80.

Since, with the triple valve device in release position, the pressure of fluid in the diaphragm chamber 32 in the control valve device and in the auxiliary reservoir will be increased an amount equal to the increase in brake pipe pressure, the pressure of fluid in this chamber acting on the under side of the diaphragm 22 together with the pressure of fluid in the slide valve chamber 17 acting on the under side of the large diaphragm 21, will be sufficient to overcome the control reservoir pressure present in the diaphragm chamber 27 acting on the diaphragm 20 together with the pressure of fluid in the control valve chamber 17, acting on the diaphragm 22, and the diaphragms 20, 21 and 22 and the stem 19 will move upwardly to the position shown in Figure 1, shifting the control slide valve to a position in which the passage 78 is uncovered. With the passage 78 thus uncovered, fluid under pressure is discharged from the brake cylinder 5 to the atmosphere in the manner hereinbefore described.

Now, when the brake cylinder pressure effective in the control valve chamber 17, reduces an amount proportionate to the increase in brake pipe pressure, the pressures acting downwardly on the diaphragms will exceed the pressures acting upwardly so that these diaphragms together with the stem 19 will be moved downwardly again, shifting the control slide valve 18 to the position in which it blanks the passage 78, closing off the further discharge of fluid under pressure from the brake cylinder to the atmosphere. By effecting further increases in brake pipe pressure, the equipment will operate to further reduce brake cylinder pressure.

Assuming now that the change-over valve device 6 is in graduated release position and it is desired to effect a direct release of the brakes, the engineer first adjusts the feed valve device so as to maintain the brake pipe pressure at the normal pressure instead of at the higher than normal pressure, and then reduces the brake pipe pressure and the pressure of fluid in the diaphragm chamber 68 in the change-over valve device to a predetermined degree below the pressure carried in the brake pipe when normally effecting a full service application.

With the pressure of fluid in the diaphragm chamber 68 thus reduced, the pressure of the spring 65 causes the follower 62 to move upwardly. As the follower is thus moved, it engages the annular collar 64 on the latch 61 and lifts the latch out of locking engagement with the stem 54.

The pressure of fluid in the diaphragm chamber 45 of the valve device is also reduced with the brake pipe pressure, so that the control reservoir pressure, present in the valve chamber 44, acting on one side of the diaphragm 41, causes said diaphragm to flex toward the left hand against the pressure of the spring pressed stop 46, shifting the slide valve 43 to its discharging position in which, the pressure of fluid in the control reservoir 3, diaphragm chamber 27 in the control valve device, and the diaphragm chamber 71 in the change-over valve device is reduced into the auxiliary reservoir 7 by way of passage 73, past the end of the slide valve 43, through slide valve chamber 44 and passage 16.

When the pressure of fluid in the diaphragm chamber 71 in the change-over valve device has been reduced to or below the normal pressure carried in the control reservoir, the pressure of the spring 51 causes the follower 50 and diaphragm 48 to operate toward the right hand, permitting the pressure of the spring 59 to operate the stem 54 in the same direction, which shifts the change-over slide valve to the position in which the passage 78 is blanked and the passage 76 uncovered.

In thus operating the equipment for changing the position of the change-over valve device from its graduated release position to its direct release position, an application of the brakes is effected and when desired the direct release of the brakes may be effected in the same manner as previously described in this specification.

From the foregoing description, it will be noted that a continuous and complete release of the brakes or a graduated release of the brakes may be effected through the control valve device and that a direct release of the brakes may be effected independently of the control valve device and that the release desired may be selected by the engineer from his cab in a locomotive.

In a train it may be that some of the cars will be equipped with the usual or standard direct release brakes and other cars may be equipped with the brake apparatus constructed in accordance with my present invention, and when such is the case, it is desirable to cut out, on the cars equipped with my improved brake apparatus, the graduated release feature, in order to provide for the harmonious operation of the brakes throughout the train.

If the graduated feature were not cut out on the cars equipped with the apparatus constructed in accordance with my invention, the engineer might operate his brake valve device to effect a graduated release of the brakes which would cause the direct release brakes to operate to completely release the brakes and cause the other brakes to partially release, which is undesirable. With my improved brake equipment changed over to direct release; this cannot happen and the brakes on all of the cars will operate in harmony.

With the exception of the automatic change-over valve device, the equipment shown and described in this application is substantially the same as that shown, described and claimed in my pending application for United States Letters Patent, filed March 9, 1929 for improvements in fluid pressure brakes and serially numbered 345,659, and for this reason it is deemed unnecessary to describe all of the operations and functions of which the equipment is capable of performing, since these are clearly set forth in this prior application.

It will be understood from the foregoing description that I have provided a fluid pressure brake equipment whereby the engineer, from his cab on the locomotive, may obtain, at will, either a direct or a graduated release of the brakes on a car or a train of cars.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with means for effecting a graduated release of the brake, of means under the control of an engineer for rendering the first mentioned means either effective or ineffective to graduate the release of the brakes.

2. In a fluid pressure brake, the combination with means for effecting a graduated release of the brakes, of pressure sensitive means under the control of an engineer for rendering said means either effective or ineffective to graduate the release of the brakes.

3. In a fluid pressure brake, the combination with means for effecting a graduated release of the brakes, of a valve operative to one position for rendering said means effective to graduate the release of the brakes and operative to another position for rendering said means ineffective to graduate the release of the brakes, and pressure sensitive means under the control of an engineer for controlling the operation of said valve.

4. In a fluid pressure brake, the combination with means for effecting a graduated release of the brakes, of a valve operative to one position for rendering said means effective to graduate the release of the brakes and operative to another position for rendering said means ineffective to graduate the release of the brakes, and pressure sensitive means subject to opposing spring and fluid pressures for controlling the operation of said valve.

5. In a fluid pressure brake, the combination with means for effecting a graduated release of the brakes, of a valve operative to one position for rendering said means effective to graduate the release of the brakes and operative to another position for rendering said means ineffective to graduate the release of the brakes, means under the control of an engineer for controlling the operation of said valve, and means under the control of an engineer for locking said valve in one of said positions.

6. In a fluid pressure brake, the combination with means for effecting a graduated release of the brakes, of a valve operative to one position for rendering said means effective to graduate the release of the brakes and operative to another position for rendering said means ineffective to graduate the release of the brakes, pressure sensitive means operative to control the operation of said valve, and pressure sensitive means for locking said valve in one of said positions.

7. In a fluid pressure brake, the combination with means for effecting a graduated release of the brakes, of a valve operative to one position for rendering said means effective to graduate the release of the brakes and operative to another position for rendering said means ineffective to graduate the release of the brakes, pressure sensitive means operative to control the operation of said valve, a latch operative to lock said valve in one position and operative to unlock said valve, and means under the control of an engineer for operating said latch.

8. In a fluid pressure brake, the combination with means for effecting a graduated release of the brakes, of a valve operative to one position for rendering said means effective to graduate the release of the brakes and operative to another position for rendering said means ineffective to graduate the release of the brakes, pressure sensitive means operative to control the operation of said valve, a latch operative to lock said valve in one position and operative to unlock said valve, and fluid pressure controlled means for operating said latch.

9. In a fluid pressure brake, the combination with means for effecting a graduated release of the brakes, of a valve operative to one position for rendering said means effective to graduate the release of the brakes and operative to another position for rendering said means ineffective to graduate the release of the brakes, pressure sensitive means operative to control the operation of said valve, a latch operative to lock said valve in one position and operative to unlock said valve, and means subject to opposing spring and fluid pressures for controlling the operation of said latch.

10. In a fluid pressure brake, the combination with means for effecting a graduated release of the brakes of means controlled from a locomotive for rendering the first mentioned means either effective or ineffective to graduate the release of the brakes.

11. In a fluid pressure brake, the combination with means for effecting a graduated release of the brakes, of a valve operative to one position for rendering said means effective to graduate the release of the brakes and operative to another position for rendering said means ineffective to graduate the release of the brakes, means controlled from a locomotive for controlling the operation of said valve, and means controlled from the locomotive for locking said valve in one of said positions.

12. In a fluid pressure brake, the combination with means for effecting a direct release of the brakes and means for effecting a graduated release of the brakes, of means controlled from a locomotive for rendering one or the other of the first mentioned means effective or ineffective to control the release of the brakes.

13. In a fluid pressure brake, the combination with means for effecting a direct release of the brakes and means for effecting a graduated release of the brakes, of pressure sensitive means controlled from a locomotive for rendering one or the other of the first mentioned means effective or ineffective to control the release of the brakes.

14. In a fluid pressure brake, the combination with means for effecting a direct release of the brakes and means for effecting a graduated release of the brakes, of a valve operative to one position for rendering the first mentioned means effective to release the brakes and operative to another position for rendering the second mentioned means effective to release the brakes, and means controlled from a locomotive for controlling the operation of said valve.

15. In a fluid pressure brake, the combination with means for effecting a direct release of the brakes and means for effecting a graduated release of the brakes, of a valve operative in one position for rendering the first mentioned means effective to release the brakes and for rendering the second mentioned means ineffective to release the brakes and operative to another position for rendering the first mentioned means ineffective to release the brakes and for rendering the second mentioned means effective to release the brakes, and means controlled from a locomotive for controlling the operation of said valve.

16. In a fluid pressure brake, the combination with means for effecting a direct release of the brakes and means for effecting a graduated release of the brakes, of a valve operative to one position for rendering the first mentioned means effective to release the brakes and operative to another position for rendering the second mentioned means effective to release the brakes, means controlled from a locomotive for controlling the operation of said valve, and means for locking said valve in one of said positions.

17. In a fluid pressure brake, the combination with means for effecting a direct release of the brakes and means for effecting a graduated release of the brakes, of a valve operative to one position for rendering the first mentioned means effective to release the brakes and operative to another position for rendering the second mentioned means effective to release the brakes, means controlled from a locomotive for controlling the operation of said valve, and means also controlled from the locomotive for locking said valve in one of said positions.

18. In a fluid pressure brake, the combination with means for effecting a direct release of the brakes and means for effecting a graduated release of the brakes, of a valve operative to one position for rendering the first mentioned means effective to release the brakes and operative to another position for rendering the second mentioned means effective to release the brakes, means controlled from a locomotive for controlling the operation of said valve, and means for locking said valve in the position for rendering the second mentioned means effective to release the brakes.

19. In a fluid pressure brake, the combination with pressure sensitive means operative to effect a graduated release of the brakes, of valve means having a position for effecting the direct release of the brakes and for rendering said pressure sensitive means ineffective to graduate the release of the brakes, and having another position for preventing the direct release of the brakes and for rendering said pressure sensitive means effective to graduate the release of the brakes, said valve means being operative automatically from one position to the other.

20. In a fluid pressure brake, the combination with pressure sensitive means operative to effect a graduated release of the brakes, of valve means having a position for effecting the direct release of the brakes and for rendering said pressure sensitive means ineffective to graduate the release of the brakes, and having another position for preventing the direct release of the brakes and for rendering said pressure sensitive means effective to graduate the release of the brakes, said valve means being operative automatically from one position to the other, and latch means operative into and out of locking engagement with said valve means.

21. In a fluid pressure brake, the combination with pressure sensitive means operative to effect a graduated release of the brakes, of valve means having a position for effecting the direct release of the brakes and for rendering said pressure sensitive means ineffective to graduate the release of the brakes, and having another position for preventing the direct release of the brakes and for rendering said pressure sensitive means effective to graduate the release of the brakes, said valve means being operative automatically from one position to the other, and a latch operative into locking engagement with said valve means for maintaining the valve means in one of said positions and operative out of locking engagement with said valve means for permitting the valve means to be operated to the other of said positions.

22. In a fluid pressure brake, the combination with pressure sensitive means operative to effect a graduated release of the brakes, of valve means having a position for effecting the direct release of the brakes and for rendering said pressure sensitive means ineffective to graduate the release of the brakes, and having another position for preventing the direct release of the brakes and for rendering said pressure sensitive means effective to graduate the release of the brakes, said valve means being operative automatically from one position to the other, said valve means being operative by fluid under pressure to one of said positions and operative by the pressure of a spring to the other of said positions.

23. In a fluid pressure brake, the combination with pressure sensitive means operative to effect a graduated release of the brakes, of valve means having a position for effecting the direct release of the brakes and for rendering said pressure sensitive means ineffective to graduate the release of the brakes, and having another position for preventing the direct release of the brakes and for rendering said pressure sensitive means effective to graduate the release of the brakes, said valve means being operative automatically from one position to the other, a latch operative into engagement with said valve means for maintaining said valve means in one of said positions and operative out of engagement with said valve means to permit said valve means to be operated to the other of said positions, and pressure sensitive means for controlling the operation of said latch.

24. In a fluid pressure brake, the combination with a triple valve device, a brake cylinder, and a control valve device, of a valve for controlling communication through said triple valve device from the brake cylinder to the atmosphere to control the direct release of the brakes and for controlling communication through said triple valve device and control valve device from the brake cylinder to the atmosphere to control the graduated release of the brakes, and pressure sensitive means operative to selectively open and close said communications to the atmosphere.

25. In a fluid pressure brake, the combination with a triple valve device, a brake cylinder, and a control valve device, of a valve for controlling communication through said triple valve device from the brake cylinder to the atmosphere to control the direct release of the brakes and for controlling communication through said triple valve device and control valve device from the brake cylinder to the atmosphere to control the graduated release of the brakes, and pressure sensitive means for operating said valve.

26. In a fluid pressure brake, the combination with a triple valve device, a brake cylinder, and a control valve device, of a valve for controlling communication through said triple valve device from the brake cylinder to the atmosphere to control the direct release of the brakes and for controlling communication through said triple valve device and control valve device from the brake cylinder to the atmosphere to control the graduated release of the brakes, and means operative automatically for operating said valve to open either one of said communications and for closing the other of said communications.

27. In a fluid pressure brake, the combination with a brake pipe charged with fluid under pressure, of means for effecting a graduated release of the brakes, and means operative upon an increase in brake pipe pressure above normal for rendering the first mentioned means effective to graduate the release of the brakes and operative upon a predetermined decrease in brake pipe pressure below normal for rendering the first mentioned means ineffective to graduate the release of the brakes.

28. In a fluid pressure brake, the combination with a brake pipe charged with fluid under pressure, of means for effecting a graduated release of the brakes, and means normally rendering the first mentioned means ineffective to control the release of the brakes and operative upon an increase in brake pipe pressure above that normally carried in the brake pipe for rendering the first mentioned means effective to control the release.

29. In a fluid pressure brake, the combination with a brake pipe charged with fluid under pressure, of means for effecting a graduated release of the brakes, and means normally rendering the first mentioned means ineffective to control the release of the brakes and operative upon an increase in brake pipe pressure above that normally carried in the brake pipe for rendering the first mentioned means effective to control the release and further operative upon a predetermined reduction in brake pipe pressure below normal for rendering the first mentioned means ineffective to control the release of the brakes.

30. In a fluid pressure brake, the combination with a brake pipe, a triple valve device, a brake cylinder, a control valve device operative to effect a graduated release of the brakes and a control reservoir normally charged with fluid under pressure from the brake pipe, of a valve for controlling communication through said triple valve device from the brake cylinder to the atmosphere for controlling the direct release of the brakes and for controlling communication through said triple valve device and control valve device from the brake cylinder to the atmosphere to control the graduated release of the brakes, and means operative upon an increase in control reservoir pressure above normal for operating said valve to close one of said communications and to open the other of said communications.

31. In a fluid pressure brake, the combination with a brake pipe, a triple valve device, a brake cylinder, a control valve device operative to effect a graduated release of the brakes and a control reservoir normally charged with fluid under pressure from the brake pipe, of a valve for controlling communication through said triple valve device from the brake cylinder to the atmosphere for controlling the direct release of the brakes and for controlling communication through said triple valve device and control valve device from the brake cylinder to the atmosphere to control the graduated release of the brakes, and means operative upon an increase in control reservoir pressure above normal for operating said valve to close the first mentioned communication to prevent the direct release of the brakes and to open the second mentioned communication to permit the graduated release of the brakes.

32. In a fluid pressure brake, the combination with a brake pipe, a triple valve device, a brake cylinder, a control valve device operative to effect a graduated release of the brakes and a control reservoir normally charged with fluid under pressure from the brake pipe, of a valve for controlling communication through said triple valve device from the brake cylinder to the atmosphere for controlling the direct release of the brakes and for controlling communication through said triple valve device and control valve device from the brake cylinder to the atmosphere to control the graduated release of the brakes, and means operative upon an increase in control reservoir pressure above normal for operating said valve to close the first mentioned communication to prevent the direct release of the brakes and to open the second mentioned communication to render said control valve device effective to control the release of the brakes.

33. In a fluid pressure brake, the combination with a brake pipe, a triple valve device, a brake cylinder, a control valve device operative to effect a graduated release of the brakes and a control reservoir normally charged with fluid under pressure from the brake pipe, of a valve for controlling communication from the brake cylinder to the atmosphere and for controlling communication through said control valve device from the brake cylinder to the atmosphere, a movable abutment subject to control reservoir pressure and operative upon an increase in control reservoir pressure above normal for shifting said valve to close one of said communications and to open the other of said communications, a stem for operating said valve, a locking member for locking said stem and thereby said valve in one of its closing positions, and a movable abutment subject to brake pipe pressure and operated upon a predetermined reduction in brake pipe pressure below the normal for operating said member to release said stem.

34. In a fluid pressure brake, the combination with a triple valve device, a brake cylinder, a control reservoir charged with fluid under pressure from the brake pipe, and a control valve device operative to effect a graduated release of the brakes, of a valve normally closing communication through said triple valve device and control valve device from the brake cylinder to the atmosphere for rendering said control valve device ineffective to graduate the release of the brakes, and means operative by an increase in control reservoir pressure above normal for operating said valve to render said control valve device effective to graduate the release of the brakes.

35. In a fluid pressure brake, the combination with a triple valve device, a brake cylinder, a control reservoir charged with fluid under pressure from the brake pipe, and a control valve device operative to effect a graduated release of the brakes, of a valve normally establishing communication through said triple valve device from the brake cylinder to the atmosphere to effect a direct release of the brakes and normally closing communication through said triple valve device and control valve device for rendering said control valve device ineffective to control the brakes, and means subject to an increase in control reservoir pressure above normal for operating said valve to close the first mentioned communication to prevent the direct release of the brakes and to open the second mentioned communication for rendering said control valve device effective to graduate the release of the brakes.

36. In a fluid pressure brake, the combination with a triple valve device, a brake cylinder, a control reservoir charged with fluid under pressure from the brake pipe, and a control valve device operative to effect a graduated release of the brakes, of a valve normally establishing communication through said triple valve device from the brake cylinder to the atmosphere to effect a direct release of the brakes and normally closing communication through said triple valve device and control valve device for rendering said control valve device ineffective to control the brakes, a movable abutment subject to control reservoir pressure and operative upon an increase in control reservoir pressure above normal for shifting said valve to close the first mentioned communication to prevent the direct release of the brakes and to open the second mentioned communication to render said control valve device effective to graduate the release of the brakes, a stem for operating said valve, a member locking said stem and thereby said valve in position for rendering said control valve device effective to graduate the release of the brakes, and a movable abutment subject to brake pipe pressure and operated upon a predetermined reduction in brake pipe pressure below the normal for operating said member to release said stem.

In testimony whereof I have hereunto set my hand, this 11th day of December, 1929.

CLYDE C. FARMER.